Figure 1:
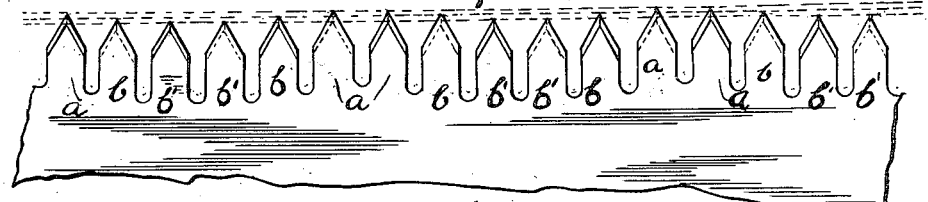

No. 853,255. PATENTED MAY 14, 1907.
W. A. MILLER.
SAW.
APPLICATION FILED JULY 26, 1904.

4 SHEETS—SHEET 1.

Witnesses
F. J. Ceihmeyer
H. M. Power

Inventor
WILLIAM A. MILLER
by Edson Bro's
Attorneys

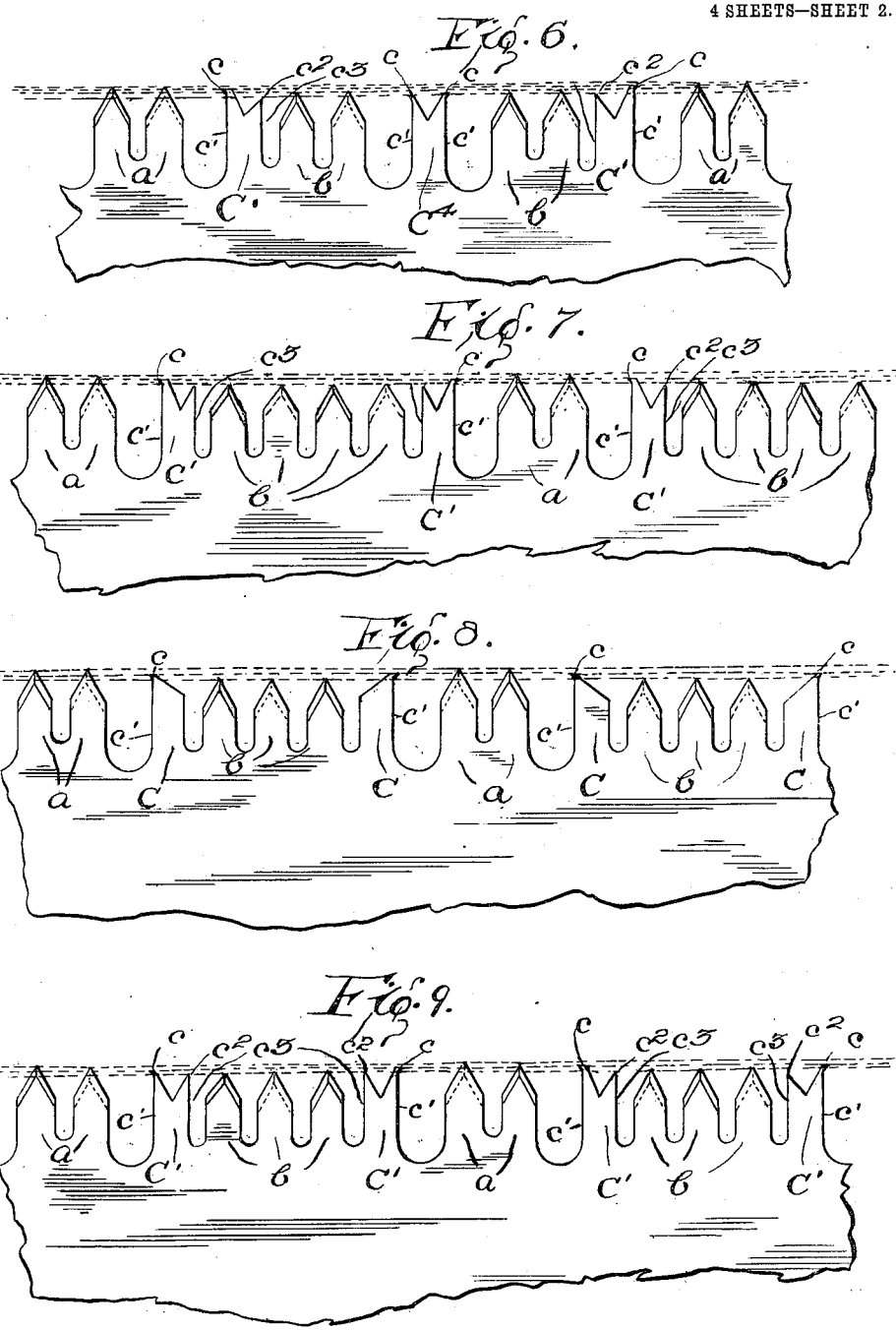

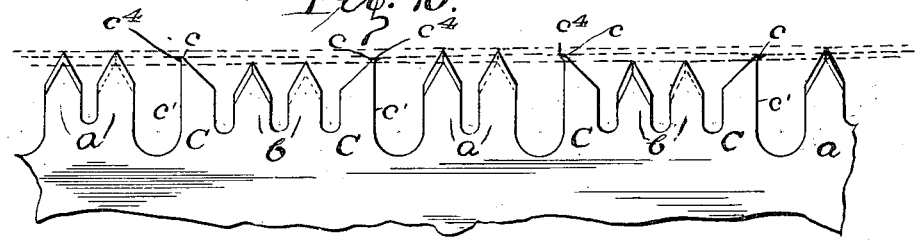
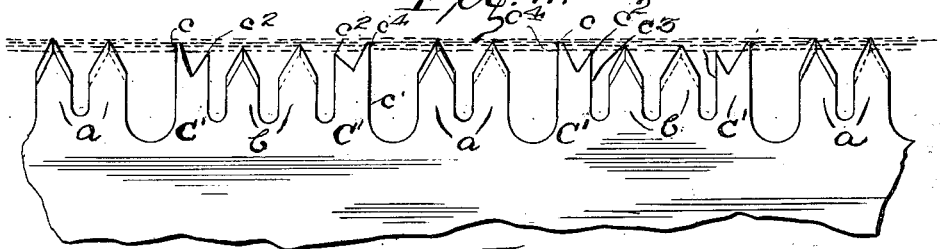
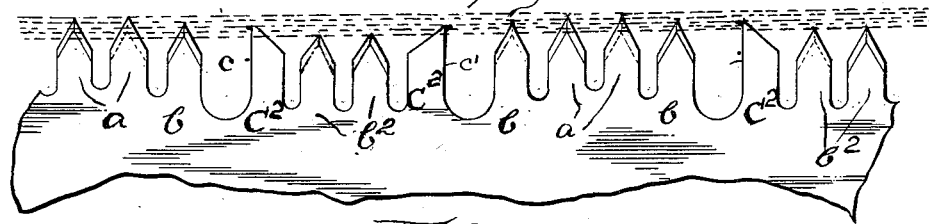
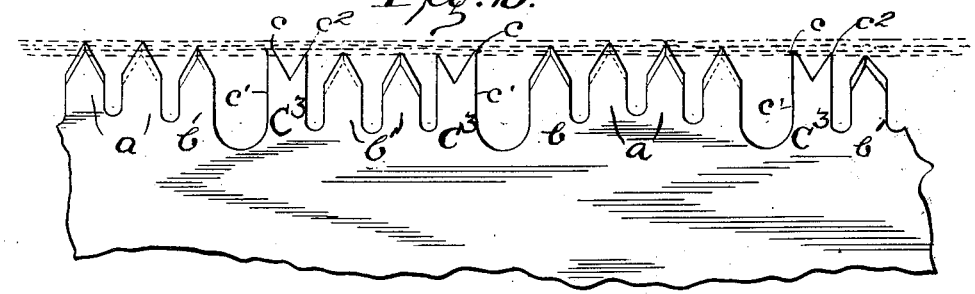

No. 853,255. PATENTED MAY 14, 1907.
W. A. MILLER.
SAW.
APPLICATION FILED JULY 26, 1904.
4 SHEETS—SHEET 4.
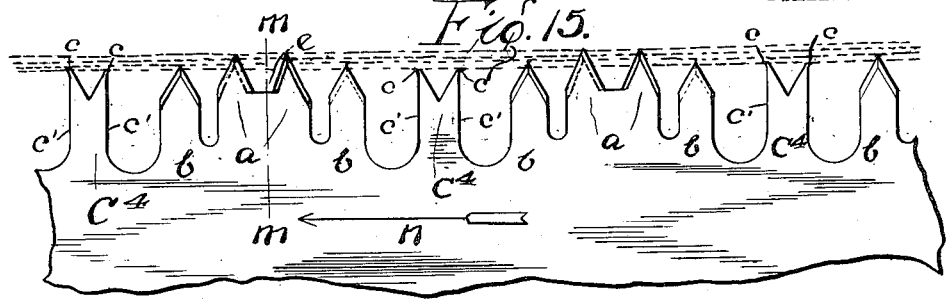
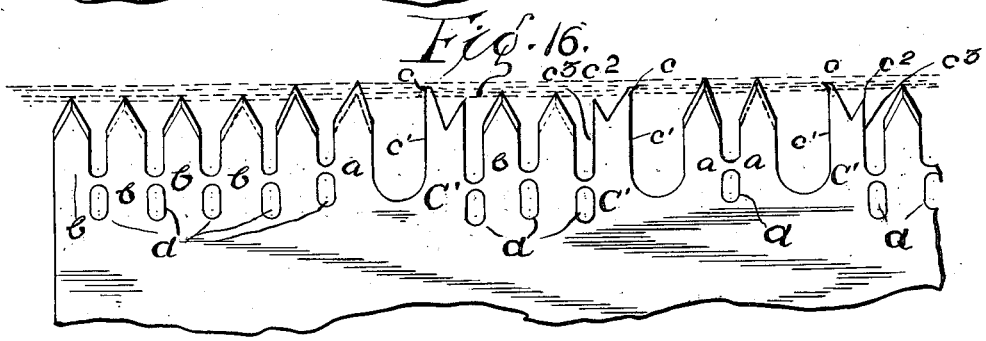
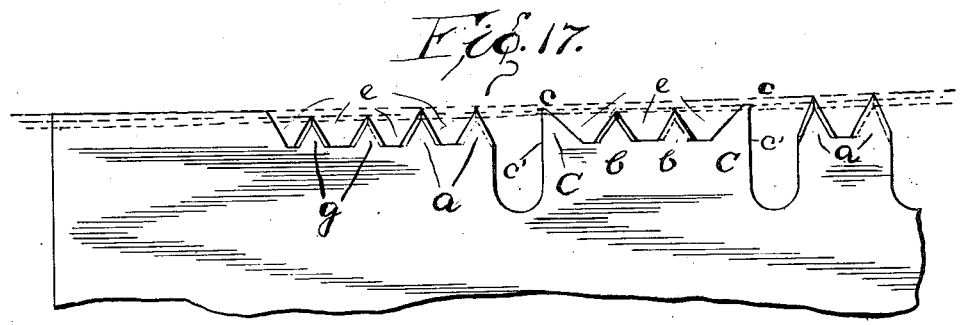
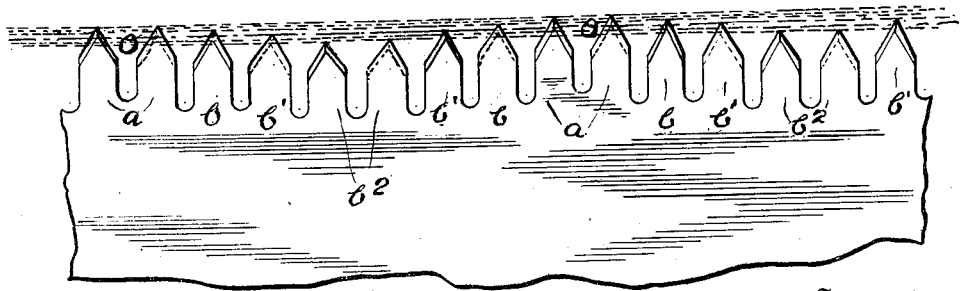
Witnesses
F. J. Veihmeyer
H. M. Tower.
Inventor
WILLIAM A. MILLER.
by Edson Bro's
Attorneys

UNITED STATES PATENT OFFICE.

WILLIAM A. MILLER, OF WAPINITIA, OREGON.

SAW.

No. 853,255.  Specification of Letters Patent.  Patented May 14, 1907.

Application filed July 26, 1904. Serial No. 218,235.

*To all whom it may concern:*

Be it known that I, WILLIAM A. MILLER, a citizen of the United States, residing at Wapinitia, in the county of Wasco and State of Oregon, have invented certain new and useful Improvements in Saws; and I do hereby declare the following to be a full, clear, and exact description of the invention, such as will enable others skilled in the art to which it appertains to make and use the same.

My invention relates to improvements in saws, more especially cross-cut saws.

Cross-cut saws are made of spring steel of not very high temper, so as to permit their cutting teeth to be bent or set in opposite lateral directions, which causes them to cut kerfs wider than the thicknesses of their blades, in order to afford clearance for the same, thereby reducing friction as much as may be practicable when at work. They may be provided solely with cutting teeth or track clearing teeth may be interspersed at suitable intervals among said cutting teeth.

The value of a cross-cut saw depends largely upon the ease and rapidity with which it will penetrate, cut away and remove the wood from the bottom of a kerf and in addition to these, as viewed by many sawyers, especially among those who hire their saws sharpened, its value is enhanced relatively in proportion to the amount of work which can be done with it before requiring resharpening. A saw which will give reasonably good service in its third day's use after it has been sharpened is evidently more valuable than one which will not do reasonably good work after about two days' use without resharpening.

It is well known that in most kinds of timber, coarse saws will cut faster and do a good deal larger amount of work, in a more satisfactory manner, without being resharpened, than fine saws will. For these reasons, many sawyers prefer to use what are known in the market as "coarse toothed saws". However, this style of expression is somewhat misleading, as it frequently has reference to the distance that the teeth or pairs of teeth lie apart, from center to center along the edge of the blade, rather than to the sizes of the teeth themselves. The wider apart the points of the cutting teeth are spaced, up to the limit of practicability, the more positive becomes the penetrative action of the saw, while the nearer together said points are formed, other things being equal, the less positive its penetrative action will become, especially with extended use. To illustrate: If a straight edged saw, provided with twelve cutting points to the foot, was at work in a kerf one foot long, there would be double the number of points opposed to the entrance of the saw into the uncut wood at the bottom of kerf than if the saw had only six cutting points to the foot. In the former case the saw would run steadier and cut smoother and if its teeth were always kept positively sharp it would do a good average amount of work, but, on account of its teeth becoming dull, its penetrative power would deteriorate more rapidly in proportion to the amount of work done, than it would in the latter. This statement is somewhat paradoxical, but it can be proven true by actual test.

The ends sought by my invention, are to combine in one saw, as far as may be practicable, the positive penetrative qualities of the so-called coarse toothed saws now in common use with the steadier running and smoother cutting qualities of finer toothed saws.

It also contemplates the making of the saw relatively coarser or finer, by providing a larger or smaller number of shorter teeth between each pair and the next successive pair of main or projecting teeth, thereby relatively increasing or decreasing its positive penetrative action, as may be desired.

It also has for its object to relatively increase or decrease the penetrative power of main or salient cutting teeth, by shortening or lengthening to different comparative degrees the shorter intervening cutting teeth, thereby giving to the saw itself, whether it be comparatively coarse or fine, a more or less positive penetrative action, as may be desired.

In the accompanying drawings, the different forms of my saw shown are all based on the same general principles, involving essentially the projecting of pairs of cutting teeth beyond the level of like intervening teeth, thus constituting salient cutting teeth.

Figure 2:
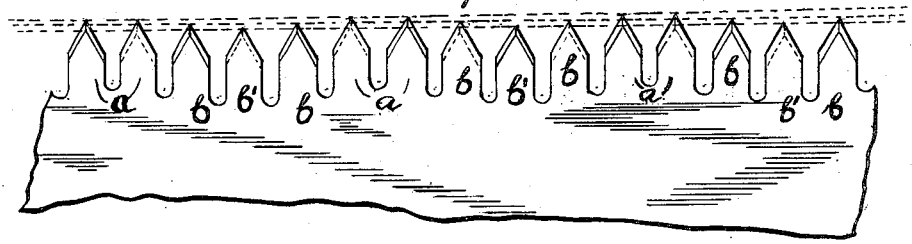
Figure 3:
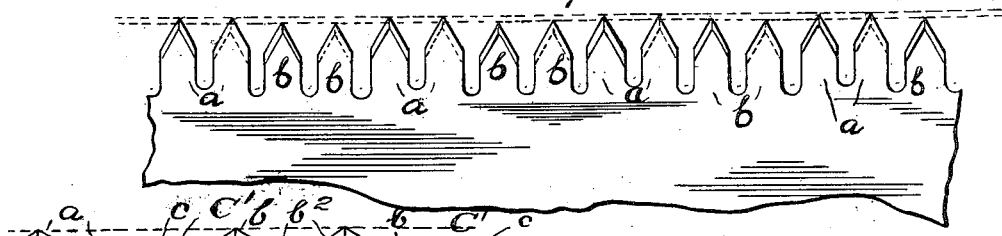
Figure 4:
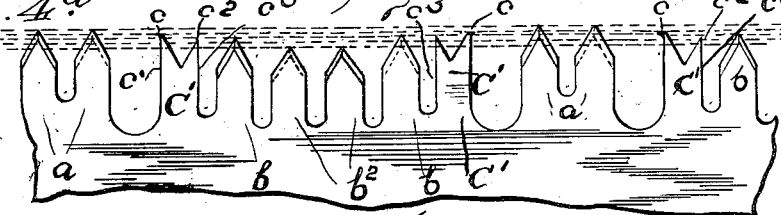
Figure 5:

Figure 1 is a side view of a portion of a saw having three grades or lengths of cutting teeth and no clearing teeth. Fig. 2 is a similar view of a saw having the same grades of cutting teeth but one less of the shorter grade in each set or group. Fig. 3 is a similar view of a saw having only two grades of cutting teeth and no clearing teeth. Fig. 4 is a side view of a portion of a saw having three grades of cutting teeth and main clearing teeth of one grade having auxiliary points operating in a different grade. Fig. 4ª is a longitudinal edge view of the portion of a saw shown in Fig. 4. Fig. 5 is a side view of a portion of a saw having two grades of cutting teeth, and one grade of clearing teeth. Fig. 6 is a similar view of a saw having two grades of cutting teeth and two grades of main clearing teeth, the main clearing teeth of one grade having auxiliary points of another grade. Fig. 7 is a similar view of a saw having two grades of cutting teeth and main clearing teeth of one grade having auxiliary points of another grade. Fig. 8 is a similar view of a saw having two grades of cutting teeth and one grade of single clearing teeth but which differs from that shown in Fig. 5 in that less of the shorter teeth are employed in each set or group. Fig. 9 is a similar view of a saw having the same combination of teeth as that shown in Fig. 7, except that a less number of shorter cutting teeth are used. Fig. 10 is a similar view of a saw having the same combination of teeth as that shown in Fig. 8 but with still less of the shorter teeth. Fig. 11 is a similar view of a saw having the same combination of teeth as that shown in Fig. 9 but with still less shorter teeth. Fig. 12 is a similar view of a saw with three grades of cutting teeth and one grade of clearing teeth, said clearing teeth being shorter than the main clearing points shown in Fig. 4. Fig. 13 is a similar view of a saw with three grades of cutting teeth and main clearing teeth of one grade having auxiliary points of another grade, but differing from that shown in Fig. 4 in the relative arrangement of said clearing and cutting teeth in each set or group. Fig. 14 is a similar view of a saw having two grades of cutting teeth and one grade of clearing teeth, said latter teeth being arranged in pairs. Fig. 15 is a similar view of a saw having two grades of cutting teeth and one grade of clearing teeth, the longer cutting teeth being made in a different form from those in the other figures. Fig. 16 is a broken side view of one end of a saw having two grades of cutting teeth and main clearing teeth of one grade having auxiliary points of another grade and showing the use of perforations in the blade and a series of cutting teeth of the shorter grade at the end of said blade. Fig. 17 is a similar view of a saw having two grades of cutting teeth and one grade of clearing teeth, said teeth being arranged in a unique way. Fig. 18 is a broken side view of a saw having four grades of cutting teeth and no clearing teeth, an extra grade line being shown between levels $a$ and $b$ and levels $b^1$ and $b^2$ to indicate the levels of the clearing teeth.

A indicates a saw blade with a portion of its length broken away. Preferably, in all the different forms shown of said saw, the cutting teeth are beveled and set alternately in opposite lateral directions. The main or salient pairs of cutting teeth are designated as $a$ and the shorter cutting teeth as $b$, or $b'$ or $b^2$. These teeth any one or more of which may be employed and all of which are shown in Fig. 18; are of different degrees of shortness, $b$ being one degree, $b'$ two degrees, and $b^2$ three degrees shorter than the pairs of teeth $a$.

The track-clearing teeth, of which there are three forms, are designated C in Figs. 5, 8, 10, and 17; $C'$ in Figs. 4, 6, 7, 9, 11 and 16; $C^2$ in Fig. 12; $C^3$ in Fig. 13 and $C^4$ in Figs. 6, 14 and 15. The clearing teeth C and $C^2$ are the same construction, being single-pointed but the teeth $C^2$ are shorter than the teeth C as hereinafter explained. The teeth $C'$ and $C^3$ are of the same form, having a main clearing point and an opposite auxiliary point, but the teeth $C^3$ are shorter than the teeth $C'$. The teeth $C^4$ are double pointed and both of their points are main clearing points. Two forms of this double tooth $C^2$ are shown, one in Figs. 6 and 15 and another in Fig. 14. The main clearing points of each of the various forms of clearing teeth are designated $c$ and the main clearing faces $c'$. The auxiliary clearing points of the clearing teeth $C'$ and $C^3$ are designated $c^2$ and their auxiliary clearing faces $c^3$. The cutting points of the clearing teeth $C^2$, $C^3$ and $C^4$ are made shorter than usual as compared with the primary cutting edge of the saw. As to their relative degree of shortness the two kinds of teeth $b$ and $C$ vary both specifically and independently, as much as may be necessary to properly regulate the cutting action of the saw, as will be hereinafter explained.

As shown in Fig. 16, the saw blade may be provided with perforations $d$. In Figs. 15 and 17 the blade is produced with V-shaped notches $e$. In Fig. 17 are shown the finishing teeth $g$ of the saw. The pairs of salient cutting teeth $a$ are of equal length. The spaces between said pairs of teeth $a$ are made longer or shorter, as may be required, to give the requisite degree of coarseness or fineness to the saw, and in between these teeth are provided the necessary number of shorter teeth, all of which may be cutting teeth, as shown in Figs. 1, 2, 3 and 18, and if the saw is to be used for cutting through tree-trunks or logs of considerable size, they may some of them be cutting and some of them clearing teeth, arranged preferably as shown in Figs. 4 to 17 inclusive, it being understood that the two kinds of teeth, namely, cutting and clearing teeth may be different in outline and size and regulated as and for the purposes hereinafter described.

In the coarsest ordinary cross-cut saw known to me, pairs of cutting teeth are located four inches apart, from center to center, with double pointed track clearers in middle of intervening spaces. Taking the above mentioned distance between the cutting teeth as about the practical limit, as to coarseness of saws in general use and in my construction considering the distance from center to center, of the jutting or salient pairs of teeth $a$ as a gage of coarseness, it will hereinafter be seen that it is practicable to make the latter materially coarser than the former. But, whatever distance between the cutting teeth may be considered as the practical limit as to coarseness in other saws, it will become evident hereinafter, that all things considered, the peculiar conformation of my saw will permit it to be made coarser than usual without seriously impairing its steady running and smooth-cutting qualities.

It is well known that the ordinary forms of coarse "crosscuts" have a tendency to run more or less roughly and that, if they be very coarse, they are liable to catch or jump, especially when sawing through knots or across "corners." In my construction, in order to make the saw coarser than usual and at the same time lessen the objectionable features just referred to, as well as others herein mentioned, shorter teeth are located between the jutting or salient pairs $a$, which consist preferably of the number and kind shown and all arranged as in the different figures and modified and regulated as described, so as to best adapt them to produce in an efficient manner the intended results.

The arrangement, modification, etc., of the teeth, as relating to comparative coarseness or fineness of the saw may be described as follows: In Figs. 10, 11, 16 and 17 two clearing teeth and two cutting teeth are located between the jutting or salient pairs of cutting teeth $a$. The distance from center to center of said jutting pairs $a$, in the four figures just mentioned, may be taken as giving about a medium degree of coarseness to this kind of saw. In Fig. 14, one wide, double-pointed clearing tooth and two cutting teeth are located between said jutting or salient pairs $a$, which gives a medium degree of coarseness, same as represented by Figs. 10, 11, 16 and 17, while in Fig. 15 a narrower double pointed clearing tooth is used instead of the wider one shown in Fig. 14, which makes the saw a little finer than medium. It will be noted, that in Figs. 1, 2, 3 and 18 no clearing teeth are shown. Fig. 1 has four cutting teeth between the jutting pairs $a$, which makes it a little finer than medium and Figs. 2 and 3 are respectively made still finer having respectively one and two less intervening teeth. Fig. 3 represents the finest form of the saw shown in any of the figures, while in Fig. 18 the saw is made slightly coarser than medium by using six cutting teeth between said pairs $a$.

In Figs. 8 and 9 two clearing teeth and three cutting teeth are shown between the jutting pairs $a$, constituting the saw somewhat coarser than medium. In Figs. 4, 5, 7, 12 and 13 two clearing teeth and four cutting teeth are shown between the jutting pairs $a$, making the saw considerably coarser than medium, while in Fig. 6 three clearing teeth and four cutting teeth are shown between said pairs $a$, representing the coarsest form of the saw shown in any of the figures.

Of course it will be understood that any of the above described different forms of this saw may be made coarser or finer in the usual manner, that is, by making the teeth wider or by locating them farther apart or, reversely, by making them narrower or locating them nearer together.

All of the cutting teeth $a$, $b$, $b'$, and $b^2$ are given precisely the same amount of set, so that, whenever the shorter ones enter the limits of the kerf in the act of sawing, whatever proportionate amount of cutting they may do, or whether they do any at all, they will at all times rub against the sides thereof and thus to some extent act as guides for the longer ones (which do the most cutting, thus tending to give the saw a steady running and smooth cutting action.

It is obvious that the penetrative power of a saw depends to a great extent upon the arrangement, amount and evenness of the set, shape, etc., of its cutting teeth, because no matter what kind of clearing teeth may be used or in how good order they may be kept, they can neither rake, scrape nor plane off and remove the wood from the bottom of the kerf more rapidly than it is severed by the former from the outlying boundaries thereof.

The arrangement, modification, etc. of the shorter intervening cutting teeth, so as to increase or decrease the relative penetrative power of the jutting or salient pairs $a$ of same, may be described as follows: In Figs. 3, 6, 7, 9, 11, 14, 15, 16 and 17 all of the former are on the first level from, that is, one degree shorter than the latter, in which case all of the former will do a considerable amount of cutting and thereby counteract and consequently lessen the penetrative power of the latter more than they would if they were on the second level therefrom. In Figs. 5, 8 and 10, all of the former are on the second level from, that is, two degrees shorter than the latter and consequently do a less amount of cutting than they would if they were on the first level therefrom, whereby the penetrative power of the latter is increased. In Figs. 1, 2 and 13, some of the former are on the first level and part is on the second level; in Fig. 12 some are on the first level and some are on the third level; in Fig. 4 some are on the second level and part is on the third level; and in Fig. 18 some are on the first level, some on the second level, and some on the third level from the latter. In the last six figures mentioned, namely, Figs. 1, 2, 4, 12, 13 and 18, if the points of certain of the shorter cutting teeth, which are either two or three degrees shorter than the main cutting pairs *a*, are respectively made one degree longer; then said certain ones, by reason of their relatively increased length, will do more cutting and consequently decrease in varying degrees, according to the degree of modification, the relative penetrative power of said pairs *a*.

As before stated, each of the cutting teeth is given precisely the same amount of set, therefore whatever proportionate amount of cutting any of the shorter teeth may do, it will always be done in line with, and below the bottom of, the gashes already made by the longer ones, thereby invariably promoting the penetrative action of the saw.

The different levels or degrees above referred to lie preferably from about one thirty-second of an inch upward, to about one-sixteenth of an inch apart. Thus the cutting teeth, *b*, *b'*, and *b²* may be respectively about one thirty-second, one sixteenth and three-thirty-seconds of an inch shorter than the main or salient cutting pairs of teeth *a*, or they may be respectively any intermediate distances upward, to a little more than one sixteenth, one eighth, and three sixteenths of an inch shorter than said pairs of teeth *a*, according to the relative degree of penetrative power which it may be desired to give to the latter for the purpose of adapting the saw to varying conditions, such as comparatively thick or thin blades, comparatively long or short or wide or narrow teeth, amount of power and degree of curvature of cutting edge required, and size and quality of timber to be cut.

Now it will be readily understood that it is practicable to relatively increase or decrease the penetrative power of the main or salient cutting pairs of teeth *a* by shortening or lengthening, in the manner described, the shorter intervening cutting teeth located between said salient teeth, thereby relatively increasing or decreasing the positive penetrative action of the saw, as may be desired, whether it be comparatively coarse or fine.

The arrangement, modification, etc., of the track clearing teeth may be described as follows: In Figs. 4 to 11 inclusive, also in Figs. 16 and 17, the clearing teeth C and C¹, each of which is provided with a single cutting point *c*, are located next to, and on both sides of, the pairs of main cutting teeth *a*, with their cutting points *c* and main clearance faces *c'* facing respectively toward the respective pairs of teeth *a*, except, at the outermost sides of the last of said pairs of teeth *a*, near the ends of the blade, where finishing teeth *g* may be used, as will be explained farther on. In the ten figures last mentioned above, the cutting points *c* of said clearers C and C¹ are located at about the same distance from the points of said pairs of teeth *a* as like points are from like points in ordinary saws. Therefore, the degree of shortness of said cutting points *c*, as compared with the points of said pairs of teeth *a*, to adapt them to varying conditions, are about the same as in said ordinary saws. So in this case, said cutting points *c* are made from a little less than three-sixty-fourths of an inch upward, to a little more than one sixteenth of an inch shorter than said pairs of teeth *a*, as may be required, to suit hard, medium hard or soft woods. In Figs. 12 to 15 inclusive, one shorter cutting tooth *b* is located between the cutting points *c* of the clearers C², C³ and C⁴ and the pairs of main or salient cutting teeth *a*, said clearers C², C³ and C⁴, therefor, being shorter than the clearers C, C¹ shown, respectively, in Figs. 5, 8, 10, and 17 and in Figs. 4, 6, 7, 9, 11, and 16, and which are placed next to the pairs of main or salient cutting teeth. In Fig. 6, two of said shorter cutting teeth *b*, and one clearing tooth C¹ are located between the cutting points *c* of the clearers C⁴ and said pairs of teeth *a*. The arrangements of the teeth, just described, in the five figures, 6, 12, 13, 14 and 15 considerably increases the distances between the cutting points *c* of said clearers C² or C³ or C⁴, and the points of said pairs *a*, as compared with the distances between the cutting points *c* of the clearers C or C¹ and said points of said pairs of teeth *a* in Figs. 4 to 11 and 16 and 17. Therefore, on account of the "drop" of the saw, the cutting points *c* of said clearers C², C³ and C⁴ necessarily have to be made comparatively shorter than in ordinary saws; also, in order to adapt them to the necessary modification of said shorter cutting teeth *b*, hereinbefore described, it is likewise necessary to vary their degree of shortness more than usual. Consequently they are made from a little less than one thirty-second of an inch upward, to a little more than three sixty-fourths of an inch shorter than the first cutting tooth *b* located in front of their clearance faces *c'*, as may be required to suit different qualities of wood. Although said short teeth are necessarily shorter than usual, as compared with the primary cutting edge of the saw, as represented by the points of the cutting teeth *a*, yet the "drop" of the saw will keep their cutting points *c* near enough to the bottom of the kerf to cause them to do effective work. The "drop" of the saw may be explained as follows: Assuming a saw like the one represented in Fig. 15 to be in action and moving in the direction indicated by the arrow *n*, the teeth both to the right and left of the point *m* will be cutting and consequently sinking or, as it were "dropping" into the wood as the saw moves forward. And by the time the cutting point *c* of the first clearing tooth at the right has reached the point *m*, it will have descended sufficiently to bring said point *c* near enough to the level of the bottoms of the gashes made by the cutting teeth ahead of it, to cause it to do effective work, as it is obvious that, other things being equal, in twice the distance the amount of "drop" will be about twice as great.

The clearing teeth C and $C^1$, shown in Figs. 4 to 11 inclusive, also those shown in Figs. 16 and 17, are, as it were, interchangeable, that is, either form may be used instead of the other. Also, the same rule applies to the clearers $C^2$ and $C^3$ shown in Figs. 12 and 13. The points $c^2$ of the clearers C and $C^3$ are made about one sixteenth of an inch shorter than their respective opposite cutting points $c$, thereby preventing said points $c^2$ from doing any appreciable amount of cutting. Hence, it is obvious that, whether the single or double pointed form of said clearers is used at the points indicated in the figures just mentioned, the penetrative action of the saw will remain the same. But, by using the modified non-cutting form of points $c^2$, as described, the faces $c^3$ adjoining thereto, will serve as auxiliaries to the opposite main clearance faces $c'$, thereby increasing the clearance capacity of the saw, which will be of advantage if it is to be used for cutting through thick timbers. The clearing teeth $C^4$ shown in Figs. 6, 14 and 15, being located in the center of the spaces between the main cutting pairs of teeth $a$, are each provided with opposite cutting points $c$ on the same level and two clearance faces $c'$ facing in opposite directions, so as to cause them respectively, to come into action with each reciprocal movement of the saw.

The cutting points $c$ of all the clearing teeth are preferably provided with short transverse planing edges by bending their sharpened points downward toward the clearance faces $c'$; as at $c^4$, Figs. 9, 10, etc., because, if said points $c$ are kept at the proper relative degree of shortness, said planing edges will, keep the wood planed off in the bottom of the kerf, nearly even with the bottoms of the gashes made by the cutting teeth and thereby promote the penetrative action of the saw. Said bent or battered down portions $c^4$ have their outer lateral edges slightly chamfered, preferably by filing the same to insure a cutting action thereof upon the wood. Also, at certain times, it may be easier or preferable to shorten the non-cutting points $c^2$ by bending them downward, than by shortening them with a file. The manner of forming said planing edges will be more fully described presently.

In order to prevent the pairs of main cutting teeth $a$ from springing laterally near their bases, when at heavy work, V-shaped notches $e$ may be provided in the blade between said teeth in any of the different forms, somewhat as shown in Fig. 15 or Fig. 17, instead of fully separating said teeth which will leave a common wide base. Said V-shaped notches $e$ may be provided between all of the cutting teeth in any form of the saw, which will evidently be of advantage, when thin-bladed saws are designed to do comparatively heavy work.

Any form of the saw may be provided with perforations $d$, somewhat after the manner shown in Fig. 16, the advantages of which are well known.

Two methods of finishing the ends of the blade are illustrated in Figs. 16 and 17. In the former the finishing teeth $b$ extend to the very end of the blade and are one degree shorter than the jutting pairs $a$, while in the latter, a blank space extends inward a short distance from the end of blade and the finishing teeth $g$ are on the same level as the pairs of teeth $a$. In either or any form of the saw shown, as many of any suitable kind of teeth as may be necessary to properly finish the ends of the blade, beyond the outermost pairs of teeth $a$ may be used, or in any of said forms its ends may be finished in any other suitable manner.

In Fig. 18, the dotted line $y$—$y$ corresponds to the curvature of the cutting edge of the saw, as it would appear if taken at the points of the jutting or salient pairs of teeth $a$, but the degree, or degrees of shortness of the intervening teeth is ascertained by measuring in right lines, as $o$—$o$, extending from point to point of the nearest teeth in each of said pairs of teeth $a$.

In this construction of saw, it will be observed that the arrangement of the teeth as shown and described, gives a more or less sinuous or wave-like outline to its cutting edge. It will also be observed that its penetrative action may be regulated in two distinct ways, namely, by locating a larger or smaller number of teeth between the main cutting pairs of teeth $a$ or by shortening or lengthening, in the manner described, the shorter cutting teeth located between said pairs of teeth $a$. And, also, it will be noted, that its clearing action is necessarily regulated by shortening or lengthening its clearing teeth regardless of the contour of its cutting edge as indicated by the points of its cutting teeth. While it is desirable to preserve a true sinuous outline along its cutting edge as far as may be possible or practicable, yet, as it seems to be out of the question to do so at all times, owing to the different functions of the two kinds of teeth used and by reason of such necessary modifications of its cutting teeth as the nature of the case may require, in order to give it as wide a range of usefulness as may be practicable; therefore, whatever degree of sinuosity may be shown in any of the different forms illustrated, it should be considered simply as an incidental or circumstantial rather than an essential feature of the invention. For example: if in a saw, modified somewhat as represented in Figs. 6, 7, 9, 11, 16 or 17 the cutting teeth $b$ are made one thirty-second of an inch, or any less distance, shorter than the main cutting pairs of teeth $a$, it would then be necessary to make the clearing teeth C or $C^1$, as the case may be, a little shorter than said cutting teeth $b$, in order to prevent their cutting points $c$ from being brought down, as by the "drop" of the saw, below the level of the bottoms of the gashes made by said pairs of teeth $a$, in which case, of course, the saw would not work satisfactorily. Hence, it is obvious, that it is hardly practicable to always preserve a true sinuous outline along its cutting edge, without restricting its range of usefulness more or less.

In any of its forms, the points of all of the intervening teeth might be made only a little shorter, say about one thirty-second of one inch, than the jutting or salient pairs $a$ when the saw is being manufactured, in which case, the user could afterward regulate it to suit the particular work at hand. This method of making the saw would evidently be of advantage to both manufacturer and user, as the former need not keep so large a stock thereof on hand in order to supply the different modified forms which might be called for and most likely the latter would know best how to regulate it so as to adapt it to suit his own particular needs.

Various slight alterations may be consistently made in this form of saw, without departing from the spirit of the invention and consequently may be used in connection therewith.

Having thus described my invention, what I claim as new and desire to secure by Letters Patent, is:

1. A saw having pairs of alternately set salient or main cutting teeth and separate single cutting teeth being set laterally to the same planes as said pairs of cutting teeth, and alternating with said pairs of cutting teeth.

2. A saw having pairs of alternately set salient or main cutting teeth, and other cutting teeth of different lengths alternating with said salient cutting teeth, all of the cutting teeth being set laterally to the same planes.

3. A saw having pairs of alternately set salient or main cutting teeth, other cutting teeth and clearing teeth alternating with said salient cutting teeth, all of the cutting teeth being set laterally to the same planes.

In testimony whereof, I affix my signature, in presence of two witnesses.

WILLIAM A. MILLER.

Witnesses:
L. M. WOODSIDE,
L. E. WALTERS.